United States Patent [19]

Hayashi et al.

[11] Patent Number: 4,833,996
[45] Date of Patent: May 30, 1989

[54] GAS GENERATING APPARATUS FOR INFLATING AIR BAG

[75] Inventors: Minoru Hayashi; Koichi Kobari; Kimiharu Sato; Junichi Kishimoto, all of Fukushima, Japan

[73] Assignee: Nippon Koki Co., Ltd., Tokyo, Japan

[21] Appl. No.: 150,027

[22] Filed: Jan. 29, 1988

[30] Foreign Application Priority Data

Feb. 10, 1987 [JP] Japan .................................. 62-29340

[51] Int. Cl.⁴ ........................ B60R 21/10; C06D 5/00
[52] U.S. Cl. ..................................... 102/530; 280/238
[58] Field of Search ................. 102/530, 531; 280/736, 280/740–742, 738

[56] References Cited

U.S. PATENT DOCUMENTS

| | | | |
|---|---|---|---|
| 3,624,810 | 11/1971 | Hass | 280/738 |
| 3,632,133 | 1/1972 | Hass | 280/738 |
| 3,773,351 | 11/1973 | Catanzarite | 102/531 |
| 3,776,570 | 12/1973 | Weman | 102/531 |
| 3,791,669 | 2/1974 | Hamilton | 280/738 |
| 3,801,127 | 4/1974 | Kattler et al. | 280/738 |
| 3,840,246 | 10/1974 | McCullough et al. | 102/531 |
| 3,909,037 | 9/1975 | Stewart | 280/738 |

FOREIGN PATENT DOCUMENTS 1324401 7/1973 United Kingdom ................. 280/738

*Primary Examiner*—David H. Brown
*Attorney, Agent, or Firm*—Kalish & Gilster

[57] ABSTRACT

A gas generating apparatus for inflating an air bag is provided which comprises a housing body with an air intake opening of large diameter formed at the center of the housing body. Along an axis, there is a mixing chamber disposed at the center of the housing body and connected to the air intake opening with the axis and also connected so as to open into the air bag. A combustion chamber is formed inside the housing body on the inner side of the outer periphery thereof and generates a high-pressure gas upon combustion. There is a multiplicity of nozzles around the circumference of a junction portion between the air intake opening and the chamber which ejects the high pressure gas from the chamber toward an opening of the mixing chamber at high speed.

13 Claims, 1 Drawing Sheet

GAS GENERATING APPARATUS FOR INFLATING AIR BAG

BACKGROUND OF THE INVENTION

1. Field of the Invention

This invention relates to a gas generating apparatus used for inflating an air bag such as one used for a safety apparatus for protection against collision, life bag, rubber boat, escape chute, etc. More particularly, this invention concerns a gas generating apparatus for inflating an air bag whereby any shortfall in the quantity of gas required for inflating the air bag can be overcome by replenishing the air bag with air.

2. Statement of the Prior Art

Conventionally, in a passenger car, a safety apparatus adapted to protect passengers against physical shock at the time of a collision comprises an air bag with a volume of 60 liters and a gas generating apparatus which inflates this air bag, the gas generating apparatus being filled either with an explosive or a gas generating agent comprising similar constituents which is ignited and burnt at the time of a collision so as to immediately inflate the air bag with the gas generated thereby, thus protecting the driver from the effects of the collision, and preventing him from being seriously injured.

In such an apparatus, the quantity of gas generating agent required for inflating the air bag is between 70 and 100 g, and the total weight of the body of the gas generator is between 600 and 1100 g. With the above apparatus, the air bag is inflated merely by the generation of gas upon combustion of the gas generating agent; therefore, even an air bag with a 60-liter volume uses from 70 to 100 g of the generated gas, which is a relatively large amount, for the gas inflation. Consequently, the volume of the combustion chamber in the body of the gas generator has to be increased so that the gas generator becomes inevitably large in size and weight. In addition, since a relatively large amount of gas generating agent is burnt, the temperatures of the gas and the body of the gas generator becomes high, which involves such hazards as the possibility of passengers being burnt.

If the gas generating apparatus is accordingly reduced in size and weight with a corresponding reduction in the quantity of gas generating agent used therein, the air bag is not inflated to a sufficient extent and its function as a safety apparatus in time of collision is thereby compromised owing to the reduction in the amount of gas generated. Therefore, the shortfall in the quantity of gas generated needs to be overcome by supplementing the gas with air or the like.

For this purpose, it is conceivable to incorporate in the gas generating apparatus either an air ejector for replenishing air by ejecting a high-pressure gas, or a vapor ejector. However, since the primary high pressure gas in these kinds of ejector has a pressure as low as 10 kg/cm$^2$ or less, such an ejector also needs to be relatively increased in size to be effective when used with such an air bag in a safety apparatus of the type described in order that a sufficient amount of air can be sucked in some tens of milliseconds.

Accordingly, such a gas generating apparatus is inevitably increased in size and weight and this means that it remains impossible for this type of bag to be used as an air bag for an automobile.

SUMMARY OF THE INVENTION

The present invention aims to solve such problems as those described above, and an object of the present invention is to provide a small, lightweight and safe gas generating apparatus for inflating an air bag wherein the quantity of gas generating agent used for inflating the air bag is reduced without resulting in any attendant disadvantages.

In the present invention, the high-pressure gas is generated when the gas generating agent is combusted, and a large quantity of outside air is sucked in from the air intake opening and flows into a mixing chamber. This ejector effect is achieved by a cylindrically-shaped gas flow directed toward an opening of the mixing chamber from a large number of nozzles arrayed in a cylinder-like configuration. Thus, it is ensured that the air bag inflates properly and the apparatus can be reduced in size and weight by virtue of the fact that a large amount of air is sucked into the air bag even when a relatively small quantity of gas generating agent is employed, the high-temperature gas being permeated and cooled by the sucked air.

DESCRIPTION OF THE PREFERRED EMBODIMENT

Figure 1:
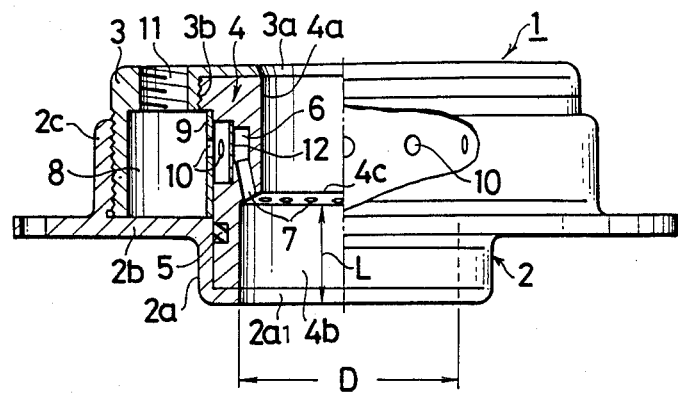
FIG. 1 is a vertical sectional view.
Figure 2:
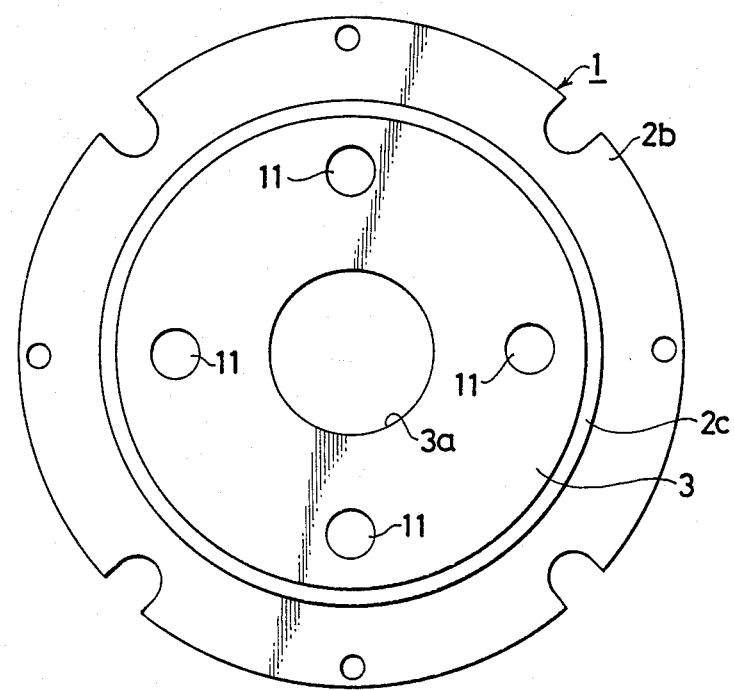
FIG. 2 is a plan view of an embodiment of the gas generating apparatus for inflating an air bag according to the present invention.

Referring now to FIGS. 1 and 2, a description will be given of a preferred embodiment of the present invention.

As illustrated in FIGS. 1 and 2, a housing body is indicated by numeral 1, which comprises a base member 2 including a cylinder portion 2a, a wide flange 2b connected to one open end of said cylinder portion 2a, a cylindrical joint portion 2c which is concentrically projected on the outer circumferential edge of said flange 2b in the opposite direction to that of the above cylinder portion 2a and being larger than the latter, as well as a cap-like cover member 3 detachably screwed inside the cylindrical joint portion 2c of this base member 2. An opening 3a with a relatively large diameter is concentrically formed at the center of a bottom plate at the center of the cover member 3 in correspondence with an opening 2a$_1$ of the cylinder portion 2a.

Also disposed at the center of the above housing body 1 is a cylinder member 4 by means of which the opening 2a$_1$ of the cylinder portion 2a and the opening 3a of the cover member 3 are communicated with each other. One end of the cylinder member 4 is screwed into a bottom plate stepped portion 3b of the cover member 3 and the other end thereof is closely fitted inside the cylinder portion 2a with the assistance of a sealing material 5, while on the inner circumference thereof are also formed a small-diameter air intake opening 4a which is connected to the opening 3a of the cover member 3 to allow outside air to be introduced and a large-diameter mixing chamber 4b which is connected to the opening 2a$_1$ of the cylinder portion 2a to allow air introduced from outside to be mixed with a combustion gas. Further, a concave portion 6 is formed in the form of a ring on the outer circumferential wall of the cylinder member 4. A multiplicity of nozzles 7 which communicate with the above concave portion 6 are formed on a stepped portion 4c where the small-diameter air intake opening 4a is connected to the large-diameter mixing chamber 4b. Thus each of the nozzles 7 is disposed in such a manner that the gas ejected from it flows toward the opening $2a_1$ of the cylinder portion 2a.

A combustion chamber denoted by reference numeral 8 is formed within the cover member 3 such as to be offset adjacent to the outer periphery thereof, and a space between this combustion chamber 8 and the above concave portion 6 is partitioned by means of a cylindrical partition 9 which is fitted with the outer periphery of the cylinder member 4. A multiplicity of gas orifices 10 are formed circumferentially in the partition 9 whereby the concave portion 6 and the combustion chamber 8 are communicated with each other. A gas generating agent in the form of either granules or pellets (not shown) is stored in the combustion chamber 8, the constituent materials of which comprise sodium azide and an oxidizing agent such as sodium nitrate or potassium perchlorate. Reference numeral 11 denotes a gas generating agent igniting device which faces the combustion chamber 8 and is mounted on the cover member 3, and reference numeral 12 denotes a filter provided inside the concave portion 6.

The ratio of the sectional area of the opening $2a_1$ of the cylinder portion 2a, i.e. the combustion chamber 8, to the total area of the throat of each nozzle 7 is preferably set at at least about 10:1 and, more preferably, 50:1 or more, The ratio L/D between the length L of the mixing chamber 4b and the diameter thereof is set between 0.5:1 and 8:1, the rate at which air is mixed preferably reaching its highest at the ratio between 5:1 and 7:1.

In a gas generating apparatus as comprised above, a combustion gas is generated and its pressure becomes between 50 and 200 $kg/cm^2$ when the gas generating agent is ignited by the igniting device 11 to burn in the combustion chamber 8. This high-pressure gas flows from the orifices 10 into the concave portion 6 and is ejected at high speed from the multiplicity of nozzles 7 arrayed in a ring-like configuration into the mixing chamber 4b, solid residues in the gas being removed when passing through a filter 12. Since at this moment the inside of the cylindrically-shaped gas flow is subjected to negative pressure by the high-speed gas flow ejected in a substantially cylindrical form toward the opening 2a, a large quantity of air within the automobile is sucked through the air intake opening 4a. This sucked air is heated by being mixed in the mixing chamber 4b with the high-temperature, high-pressure gas being ejected, the air bag being instantly (within some tens of milliseconds) inflated by the discharge of the cooled gas from the opening $2a_1$ into the air bag (not shown).

It should be noted that the pressure in the combustion chamber 8 is preferably set between 50 and 200 $kg/cm^2$ and that the ratio of the sectional area of the air intake opening 4a to the total throat area of the nozzles 7 is set at 50:1 or more. This is to ensure that the air bag is completely inflated in the space at the front of the passenger compartment of the automobile in such a short time as some tens of milliseconds, since the flow of the entire gas mixture into the air bag is reduced in speed and inflation of the air bag is delayed when the pressure in the combustion chamber 8 is low, even though the ratio of the quantity of intake air to the quantity of combustion gas becomes higher as the pressure in the combustion chamber 8 becomes lower. Furthermore, the ratio L/D is preferably set between 5:1 and 7:1.

Thus, the mixing rate of air becomes high, with the result that cooling of the combustion gas and consequently cooling of the gas generating apparatus itself can be performed effectively. This allows the gas generating apparatus to be reduced in size and weight, since the temperatures of the gas and gas generating apparatus are lower and the quantity of gas generating agent used is reduced. In addition, safety of the apparatus is improved due to the absence of any danger of burns or other hazards.

The pressure inside the automobile can be prevented from rising by virtue of the air bag being inflated in a conventional manner, because air in the automobile is sucked into the air bag during its expansion. Also, costs can be reduced in proportion to the decrease in the quantity of gas generating agent used.

It is considered that 20 to 25 g of the gas generating agent will fully inflate the air bag, since the gas generating apparatus of the embodiment according to the present invention ejects the high-speed gas flow from the entire circumference of the air intake opening $2a_1$ toward the opening 2a and sucks air positively, whereas a conventional gas generating apparatus requires 70 to 100 g of a gas generating agent to inflate an air with a volume of 60 liters provided for a driver's seat.

It should be noted that a gas generating apparatus according to the present invention is not limited to the one having the arrangement described in the above embodiment.

In addition, a gas generating apparatus according to the present invention can be applied not only to an air bag for the driver's seat of an automobile but can also be employed as a gas generating apparatus for inflating an air bag for an assistant's seat, life boat, rubber boat, escape chute, etc. where a larger quantity of air is required for inflation.

Thus, in accordance with the present invention, a gas generating apparatus comprises an air intake opening with a large diameter at the center of a housing body and a mixing chamber with a large diameter which is linked therewith and connected to the inside of an air bag, both being provided with their axes aligned with each other, a combustion chamber provided inside the outer periphery of the housing body, and a multiplicity of nozzles arrayed in the form of a ring at the junction between the above air intake opening and the mixing chamber whereby a combustion gas can be ejected at high speed therefrom. Therefore, a large quantity of outside air can be positively sucked into the air bag during an operation of the gas generating apparatus and, consequently the quantity of the gas required for inflating the air bag can be sufficiently maintained even if there is an inherently insufficient quantity of the gas generating agent employed for this purpose, thereby allowing the volume of the combustion chamber to be reduced in parallel with the lower quantity of gas generating agent used. A further effect is that the lower gas temperatures offer an improved level of safety, since the gas and air may flow into the air bag after being mixed with each other.

What is claimed is:

1. A gas generating apparatus for use in inflating an air bag, comprising:
    a housing body with a cylinder portion having an open end, a base member comprising a wide flange connected to said open end of said cylinder portion and a cylindrical joint portion which is larger in diameter than said cylinder portion and projects concentrically away therefrom;

a cover member in a cap-like form which is detachably screwed inside said cylindrical junction portion of said base member;

an air intake opening with a large diameter which is formed at the center of said cover member along an axis thereof;

a mixing chamber which is disposed at the center of said housing body, connected to said air intake opening in alignment with said axis, and for connected to the inside of an air. bag;

a combustion chamber which is formed inside said housing body on the inside of the outer periphery thereof and which generates a high-pressure gas upon combustion of a gas generating agent; and a multiplicity of nozzles around the entire circumference of a junction portion between said air intake opening and said mixing chamber which eject said high-pressure gas from said combustion chamber toward an opening of said mixing chamber at high speed.

2. A gas generating apparatus for inflating an air bag according to claim 1, wherein:

a concave portion is formed in the form of a ring on the outer circumferential wall of said cylinder portion, and further a multiplicity of nozzles connected to the concave portion are circumferentially formed in said stepped portion where said air intake opening with a small diameter and said mixing chamber with a large diameter are connected to each other, each of said nozzles being disposed such that a gas ejection flow therefrom is ejected toward said opening of said cylinder portion.

3. A gas generating apparatus for inflating an air bag according to claim 1, wherein said combustion chamber is formed in an offset position adjacent to the outer periphery of said cover member.

4. A gas generating apparatus for inflating an air bag according to claim 1, wherein the ratio of the sectional area of said opening of said cylinder portion to the total sectional area of the throat of each of said nozzles is set to be at least 10:1 or more.

5. A gas generating apparatus for inflating an air bag according to claim 1, wherein a gas generating agent igniting device is mounted on said cover member in such a manner as to face said combustion chamber.

6. A gas generating apparatus for inflating an air bag according to claim 1, including a bottom plate and, wherein said air opening is concentrically formed at the center of said bottom plate of said cover member in correspondence with said open end of said cylinder portion.

7. A gas generating apparatus for inflating an air bag according to claim 6, including a housing member wherein:

a cylinder is disposed within said housing member at the center thereof and connects said opening of said cylinder portion to said opening of said cover member;

one end of said cylinder is screwed into a stepped portion of said bottom plate of said cover member while the other end is closely fitted inside said cylinder portion with the aid of a sealing material; and further an air intake opening with a small diameter for introducing outside air and a mixing chamber with a large diameter for mixing a combustion gas therewith are provided.

8. A gas generating apparatus for inflating an air bag according to claim 1, wherein a space between said combustion chamber and said concave portion formed around said outer peripheral wall is partitioned into two by a cylindrical partition which is fitted with the outer circumference of said cylinder portion.

9. A gas generating apparatus for inflating an air bag according to claim 8, wherein a multiplicity of gas orifices which pass through said space between said combustion chamber and said concave portion formed on said outer peripheral wall of said cylinder portion are formed along the circumference of said partition.

10. A gas generating apparatus for inflating an air bag according to claim 8, wherein a filter is provided inside said concave portion formed in a ring form on said outer peripheral wall of said cylinder portion.

11. A gas generating apparatus for inflating an air bag according to claim 1, wherein the ratio L/D of the length L of said mixing chamber to the diameter D thereof is set to be between 0.5:1 and 8:1 inclusive.

12. A gas generating apparatus for inflating an air bag according to claim 11, wherein the ratio L/D of the length L of said mixing chamber to the diameter D thereof is set to be between 5:1 and 7:1 inclusive.

13. A gas generating apparatus for inflating an air bag according to claim 12, wherein the ratio of the sectional area of said opening of said cylinder portion to the total sectional area of the throat of each of said nozzles is set to be 50:1 or more.

* * * * *